US010247324B2

(12) United States Patent
Magee

(10) Patent No.: US 10,247,324 B2
(45) Date of Patent: Apr. 2, 2019

(54) THERMOSTATIC FLOW CONTROL DEVICE AND METHOD OF USE

(71) Applicant: ALSTOM Technology Ltd, Baden (CH)

(72) Inventor: Jeffrey Fred Magee, Longmeadow, MA (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 671 days.

(21) Appl. No.: 14/629,540

(22) Filed: Feb. 24, 2015

(65) Prior Publication Data

US 2016/0245421 A1    Aug. 25, 2016

(51) Int. Cl.
  *F01K 5/00*  (2006.01)
  *F16K 31/00*  (2006.01)
  *G05D 23/02*  (2006.01)

(52) U.S. Cl.
  CPC .............. *F16K 31/002* (2013.01); *F01K 5/00* (2013.01); *G05D 23/022* (2013.01)

(58) Field of Classification Search
  CPC ........ F16K 31/002; F01K 5/00; G05D 23/022
  See application file for complete search history.

(56) References Cited

U.S. PATENT DOCUMENTS

| | | | | |
|---|---|---|---|---|
| 4,932,432 A | * | 6/1990 | Berchem | F16K 5/0657 137/375 |
| 6,571,831 B1 | * | 6/2003 | Hart | G05D 7/012 138/45 |
| 2002/0079003 A1 | * | 6/2002 | Scampini | F16K 5/0407 137/625.32 |
| 2004/0123991 A1 | * | 7/2004 | Hanratty | A62C 5/02 169/14 |
| 2007/0284872 A1 | * | 12/2007 | Pionetti | F16L 1/19 285/55 |
| 2009/0205834 A1 | | 8/2009 | Garcia et al. | |
| 2010/0176330 A1 | * | 7/2010 | Seetharaman | F16K 25/005 251/368 |
| 2010/0270031 A1 | * | 10/2010 | Patel | E21B 33/1208 166/376 |
| 2012/0227409 A1 | * | 9/2012 | Paradise | F01D 25/08 60/772 |

FOREIGN PATENT DOCUMENTS

| AU | 644909 B2 | 12/1993 |
|---|---|---|
| WO | 0195696 A2 | 12/2001 |

OTHER PUBLICATIONS

European Patent Office Search Report and Written Opinion issued from corresponding EP Application No. 16156844.9 dated Jun. 22, 2016.

* cited by examiner

*Primary Examiner* — Larry L Furdge
(74) *Attorney, Agent, or Firm* — GE Global Patent Operation; Stephen G. Midgley

(57) ABSTRACT

A flow control device is used to regulate fluid flow from an upstream supply source to a downstream destination within a plant. At least portions of the flow control device are fabricated from one or more thermostatic materials selected based on the specific thermostatic properties thereof. The basic arrangement of the flow control device includes at least one housing with at least one thermostatic beam and at least one wall fixed thereto to define a void interior area with opposed open ends, and a center plug member with at least one opening in at least one wall thereof arranged within the interior area for temperature dependent fluid flow therethrough.

21 Claims, 11 Drawing Sheets

THERMOSTATIC FLOW CONTROL DEVICE AND METHOD OF USE

FIELD OF THE DISCLOSURE

In general, the present disclosure relates to a thermostatic flow control device and method of using the same for control of a fluid flow. More specifically, the present disclosure relates to a thermostatic flow control device useful in processes where fluid flow requirements are dependent upon changes in plant load and/or thermal conditions.

BACKGROUND OF THE DISCLOSURE

Temperature-actuated valve assembles that open or close at a predetermined temperature are used in a wide variety of industries. In the avionics industry, temperature-actuated valve assemblies are commonly used as over-temperature shutoff valves in airplane bleed air systems. Such over-temperature shutoff valves are configured to close to thereby protect temperature sensitive downstream components, when fluid conducted by the valve assembly becomes too hot. Some over-temperature shutoff valves of this type employ thermal fuse plugs made of eutectic alloys that abruptly melt at a predetermined actuation temperature. The fuse plug maintains a spring-loaded flapper or other such valve element in an open position. When the bleed air heats the fuse plug to its melting point, the fuse plug abruptly melts and the flapper or valve element is permitted to swing shut.

Even though over-temperature shutoff valves of the type described above are effective for decreasing airflow in an airplane when the bleed air surpasses a particular temperature threshold, the fuse plugs employed by such shutoff valves require replacement after each valve actuation. Although over-temperature shutoff valves have been developed that employ non-perishable temperature sensitive components, such over-temperature shutoff valves may still require manual intervention to be reset. As such, such over-temperature shutoff valves are not readily lent to applications in other industries.

In many industries, such as the power industry, there is a need to regulate fluid flow dynamically in response to plant load and/or varying process requirements. Such varying fluid flow can be facilitated via a control valve replete with pneumatic or motor operated actuation, provided a robust control system is implemented. The dynamic function of such a control valve is desirable in that operation of the control valve can be programmed or specified to meet specific plant operating nuances in order to optimize plant performance and efficiency. However, achieving such dynamic function using a control valve and control system comes at the cost of increased control complexity, increased number of moving parts, increased equipment wear, and decreased operational reliability.

Considering the foregoing, it is desirable to provide a reliable, temperature-actuated valve assembly with relatively few components configured to actuate to allow fluid flow or to increase fluid flow upon a fluid reaching a predetermined temperature or increasing in temperature beyond a predetermined temperature. It would also be desirable if such a valve assembly were configured to automatically reset to prevent flow or to decrease fluid flow upon a fluid reaching a predetermined temperature or decreasing in temperature beyond a predetermined temperature.

SUMMARY OF THE DISCLOSURE

A flow control device and a method of using the same is disclosed herein. The subject flow control device may be used to regulate fluid flow from an upstream supply source to a downstream destination. At least portions of the subject flow control device are manufactured from one or more thermostatic materials selected based on the specific thermostatic properties thereof, as described in detail below. The basic arrangement of the subject flow control device comprises at least one housing with a fluid inlet at a first open end thereof. Upon fluid contacting the flow control device and entering the open end, the fluid warms or heats the at least one housing including thermostatic portions thereof. As a function of temperature, as the at least one housing is warmed or heated the thermostatic portions of the housing(s) expand thereby displacing at least one wall of each of the at least one housing in a direction to expose or further expose at least one opening defined by at least one wall of a stationary center plug member arranged within an interior area(s) of the housing(s). With this displacement of the housing walls and exposure or further exposure of the at least one opening in the at least one wall of the stationary center plug member, an increase in the amount of fluid passing through the at least one opening to a downstream destination is accommodated.

For purposes of example, in industrial plant use the subject flow control device provides a reliable, temperature-actuated valve assembly having relatively few components, configured to actuate to accommodate varying amounts of fluid flow corresponding with varying temperatures of the fluid contacting the flow control device. As such, as the temperature of the fluid contacting the flow control device increases, thermostatic portions of the flow control device expand to expose or further expose at least one opening in the center plug member to accommodate an increased fluid flow therethrough. As the temperature of the fluid contacting the flow control device decreases, thermostatic portions of the flow control device contract to obscure or further obscure the at least one opening in the center plug member to accommodate a decreased fluid flow therethrough. In an industrial plant, such as a power plant, the volume of flue gas generated and the temperature of the flue gas flowing through the system is dependent upon load conditions. Under peak load conditions, more flue gas is produced and the flue gas is of a higher temperature than flue gas produced under standard load conditions. Under low load conditions, less flue gas is produced and the flue gas is of a lower temperature than flue gas produced under standard load conditions. Likewise, the power plant working fluid, e.g., water, requirements are dependent upon the power plant load conditions. For example, a power plant operating under low load conditions requires a relatively small amount of working fluid that flows through the system contacting the subject flow control device. As such, under low load conditions the working fluid contacting the subject flow control device will have a relatively low temperature, since the working fluid temperature varies in accordance with variations in flue gas temperature. This working fluid low load temperature or temperature range is known to those designing power plants and those determining components to be used therein, components such as flow control devices. Hence, this known temperature or temperature range is referred to herein as a "predetermined" temperature. Likewise, a power plant operating under peak load conditions during peak hours of demand requires a relatively large amount of working fluid that flows through the system contacting the subject flow control device. As such, the working fluid contacting the subject flow control device will have a relatively high temperature corresponding with the relatively high temperature of the flue gas. This working fluid peak load temperature or temperature range is known to those designing power plants and those determining components to be used therein, components such as flow control devices. Hence, this known temperature or temperature range is also referred to as a "predetermined" temperature. In the present example, working fluid contacting the subject flow control device either heats or cools the flow control device causing thermostatic portions of the flow control device to either expand or contract, respectively, as a function of temperature. Upon heating the flow control device, thermostatic portions of the at least one housing expand thereby displacing the at least one wall fixed to each of the at least one housing to expose or further expose at least one opening defined by at least one wall of a center plug member arranged within an interior area(s) of the at least one housing. This thermostatic housing expansion and displacement of the housing wall(s) accommodates an increased working fluid flow through the exposed or further exposed at least one opening to a downstream destination. At times of greater power demand, the power plant operates under increased load conditions thereby requiring an increased amount of working fluid that flows at an increased velocity through the system and through the subject flow control device. As such, the working fluid flowing through the subject flow control device is at a higher temperature than that of working fluid produced under lesser or standard load conditions. As the temperature of the working fluid increases, thermal expansion of thermostatic portions of the at least one housing also increases, and displacement of the housing wall(s) increases. As displacement of the housing wall(s) increases, the at least one opening in the center plug member are exposed or further exposed, thereby accommodating an increased flow of relatively hotter working fluid therethrough. Upon cooling the flow control device, thermostatic portions of the housing contract and the housing wall(s) are displaced to obscure or further obscure the at least one opening through the at least one wall of the center plug member through which the working fluid flows to a downstream destination. At times of relatively low power demand, the power plant operates under decreased load conditions thereby requiring a decreased amount of working fluid that flows through the system to reach the subject flow control device. As such, the working fluid reaching the subject flow control device is at a lower temperature than that of working fluid produced under greater load conditions. As the temperature of the working fluid decreases, thermal contraction of thermostatic portions of the housing increases, and displacement of the housing wall(s) increases. As displacement of the housing wall(s) increases, the at least one opening in the at least one wall of the center plug member is obscured or further obscured, thereby accommodating a decreased amount of relatively cooler working fluid flow therethrough.

As noted above, a valve assembly configured to automatically reset is desirable. Such is true of the subject flow control device. The subject flow control device provides a reliable, temperature-actuated valve assembly having relatively few components, configured to accommodate increases in fluid flow and decreases in fluid flow based on fluid temperature. A method of using the subject flow control device comprises providing at least one, at least partially, thermostatic housing sized, dimensioned and secured within a pipe or circuit used for fluid flow, positioning a center plug member sized and dimensioned for leak minimizing fit within interior area(s) of the housing(s) thereby covering, closing, or obscuring at least one opening defined by at least one wall of the center plug member, and contacting the housing(s) and center plug member with a fluid flow through the pipe or circuit having a temperature greater than the temperature of the flow control device, thereby heating the flow control device causing thermostatic portions of the housing(s) to expand for displacement of the housing wall(s) to expose or further expose the at least one opening in the at least one wall of center plug member for increased fluid flow therethrough. Another method of using the subject flow control device comprises providing at least one, at least partially thermostatic, housing sized, dimensioned and secured within a pipe or circuit used for fluid flow, positioning a center plug member sized and dimensioned for leak minimizing fit within interior area(s) of the housing(s) thereby exposing or further exposing at least one opening defined by the at least one wall of the center plug member, and contacting the housing(s) and center plug member with a fluid flow through the pipe or circuit having a temperature less than the temperature of the flow control device, thereby cooling the flow control device causing the thermostatic portions of the housing(s) to contract for displacement of the housing wall(s) to obscure or further obscure the at least one opening in the at least one wall of the center plug member to minimize or decrease fluid flow therethrough. Still another method of using the subject flow control device comprises providing at least one, at least a partially thermostatic, housing sized, dimensioned and secured within a pipe or circuit used for fluid flow, positioning a center plug member sized and dimensioned for leak minimizing fit within interior area(s) of the housing(s) thereby covering, closing, or obscuring at least one opening defined by at least one wall of the center plug member, and contacting the housing(s) and center plug member with a fluid flow through the circuit having a temperature greater than the temperature of the flow control device, thereby heating the flow control device causing thermostatic portions of the housing(s) to expand for displacement of the housing wall(s) to expose or further expose the at least one opening in the at least one wall of the center plug member for increased fluid flow therethrough, or contacting the housing(s) and center plug member with a fluid flow through the pipe or circuit having a temperature less than the temperature of the flow control device, thereby cooling the flow control device causing thermostatic portions of the housing(s) to contract for displacement of the housing wall(s) to obscure or further obscure the at least one opening in the at least one wall of the center plug member to minimize or decrease fluid flow therethrough.

In summary, the subject flow control device comprises at least one housing, each housing having at least one thermostatic beam with at least one wall fixed thereto, with the housing(s) defining void interior area(s) between opposed open ends. The at least one thermostatic beam is fabricated from one or more thermostatic materials selected from the group consisting of austenitic metal grades. Integrally formed with or fixed to the at least one thermostatic beam is at least one wall fabricated from one or more materials selected from the group consisting of ferritic metal grades. An interior surface of the housing(s) may be coated with one or more materials selected from the group consisting of ceramic materials and polytetrafluoroethylene. A stationary center plug member is arranged within the interior area(s) of the housing(s) with at least one side wall of the center plug member defining at least one opening therethrough in fluid communication with a center plug member open interior area and open bottom. The subject center plug member is fabricated from one or more materials selected from the group consisting of ferritic metal grades. Likewise, the center plug member may also or in the alternative be coated with one or more materials selected from the group consisting of ceramic materials and polytetrafluoroethylene. The subject flow control device is operable for a temperature increase of 300 to 500 degrees Celsius, or more specifically, for a temperature increase of 300 to 350 degrees Celsius, or most specifically, for a temperature increase of 312 degrees Celsius for thermostatic beam expansion of 0.6% displacing walls fixed thereto approximately 0.6% of a total possible distance toward an open position to expose or further expose the at least one opening in the at least one wall of the center plug member. This exposure or further exposure of the at least one opening in the at least one wall of the center plug member accommodates a corresponding increase in fluid flow therethrough. Further, the subject flow control device is operable for a temperature decrease of 300 to 500 degrees Celsius, or more specifically, for a temperature decrease of 300 to 350 degrees Celsius, or most specifically, for a temperature decrease of 312 degrees Celsius for thermostatic beam contraction of 0.6% displacing walls fixed thereto approximately 0.6% of a total possible distance toward a closed position to obscure or further obscure the at least one opening in the at least one wall of the center plug member. Obscuring or further obscuring the at least one opening in the at least one wall of the center plug member accommodates a corresponding decrease in fluid flow therethrough.

In summary, a method of using the subject flow control device comprises arranging at least one housing, each housing with at least one thermostatic beam and at least one wall fixed thereto defining void interior area(s), within a pipe or conduit for fluid flow, and arranging a center plug member with at least one opening defined by at least one wall of the center plug member within the interior area(s) of the housing(s) to control fluid flow therethrough depending upon a temperature of the fluid flow. For purposes of this method, each of the at least one housing includes at least one thermostatic beam fabricated from one or more thermostatic materials selected from the group consisting of austenitic metal grades. Each of the at least one housing also includes at least one wall integrally formed with or fixed to the at least one beam fabricated from one or more materials selected from the group consisting of ferritic metal grades. A center plug member with at least one opening defined by at least one wall thereof is fabricated from one or more materials selected from the group consisting of ferritic metal grades. As such, the subject flow control device is operable for a temperature increase of 300 to 500 degrees Celsius, or more specifically, a temperature increase of 300 to 350 degrees Celsius, or most specifically, a temperature increase of 312 degrees Celsius for thermostatic beam expansion of 0.6% displacing the walls fixed thereto approximately 0.6% of a total possible distance in a direction toward an open position to expose or further expose the at least one opening in the at least one wall of center plug member. Exposing or further exposing the at least one opening in the at least one wall of the center plug member accommodates an increase in fluid flow therethrough, and for a temperature decrease of 300 to 500 degrees Celsius, or more specifically, a temperature decrease of 300 to 350 degrees Celsius, or most specifically, a temperature decrease of 312 degrees Celsius for thermostatic beam contraction of 0.6% displacing walls fixed thereto approximately 0.6% of a total possible distance in a direction toward a closed position to obscure or further obscure the at least one opening in the at least one wall of the center plug member. Obscuring or further obscuring the at least one opening in the at least one wall of the center plug member accommodates a decrease in fluid flow therethrough.

In summary, another method of using the subject flow control device comprises arranging at least one housing, each housing with at least one thermostatic beam and at least one wall fixed thereto defining a void interior area between opposed open ends, within a pipe or circuit for fluid flow, arranging a center plug member with at least one opening defined by at least one wall fluidly connected to an open interior area and an open bottom, to control fluid flow therethrough depending upon a temperature of the fluid flow, and producing a fluid flow within the pipe or circuit with a temperature of fluid flow contacting the housing(s), and if the fluid flow temperature is greater than a temperature of the housing(s), causing the thermostatic beams of the housing(s) to expand and expose or further expose the at least one opening in the at least one wall of the center plug member to increase fluid flow therethrough, and if the fluid flow temperature is less than a temperature of the housing(s), causing the thermostatic beams of the housing(s) to contract and obscure or further obscure the at least one opening in the at least one wall of the center plug member to decrease fluid flow therethrough. For purposes of this method, the thermostatic beams of the housing(s) are fabricated from one or more thermostatic materials selected from the group consisting of austenitic metal grades. The at least one wall fixed to the at least one thermostatic beam of the housing(s) is fabricated from one or more materials selected from the group consisting of ferritic metal grades. The center plug member is fabricated from one or more materials selected from the group consisting of ferritic metal grades. As such, the device is operable for a temperature increase of 300 to 500 degrees Celsius, or more specifically, a temperature increase of 300 to 350 degrees Celsius, or most specifically a temperature increase of 312 degrees Celsius for thermostatic beam expansion of 0.6% displacing walls fixed thereto approximately 0.6% of a total possible distance toward an open position to expose or further expose the at least one opening in the at least one wall of the center plug member. Exposing or further exposing the at least one opening in the at least one wall of the center plug member accommodates an increase in fluid flow through the at least one opening. For a temperature decrease of 300 to 500 degrees Celsius, or more specifically a temperature decrease of 300 to 350 degrees Celsius, or most specifically, for a temperature decrease of 312 degrees Celsius thermostatic beams contract 0.6% displacing walls fixed thereto approximately 0.6% of a total possible distance toward a closed position to obscure or further obscure the at least one opening in the at least one wall of the center plug member. Obscuring or further obscuring the at least one opening in the at least one wall of the center plug member accommodates a decrease in fluid flow therethrough.

Additional features of the subject flow control device and methods of using the device will be apparent from the following description in which exemplifying embodiments of subject device and methods of using the same are set forth in detail in conjunction with the accompanying drawings.

BRIEF DESCRIPTION OF THE DRAWINGS

The present flow distribution device will now be described in more detail with reference to the accompanying drawings.

DETAILED DESCRIPTION

Figure 1:
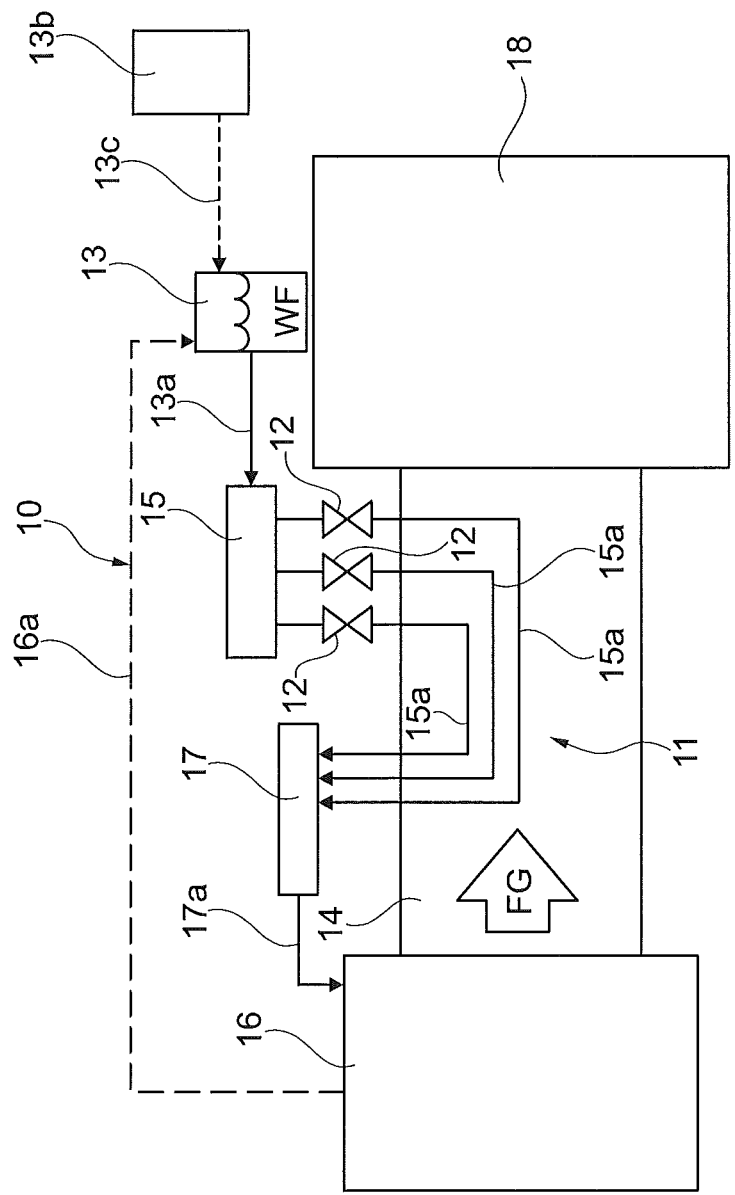
FIG. 1 is a schematic side cross-sectional view of an industrial plant with flow control devices according to the present disclosure arranged within pipes in a circuit for fluid flow.

In the subject exemplifying embodiment, the subject flow control devices 12 such as those illustrated in FIG. 1, are suitably sized and dimensioned for arrangement within pipes 15a of a working fluid circuit 11 for working fluid WF flow. At least a portion of working fluid circuit 11 passes through flue gas FG conduit 14 of an industrial plant 10. Industrial plant 10 may be for example a power plant, such as a coal-, biomass material- or natural gas-fired power plant. In industrial plant 10, the subject flow control device 12 is used to effectively control flow of a working fluid WF, such as water, from an upstream source such as a turbine 13b to a downstream destination such as a boiler 16. Further, flue gas FG is generated in a boiler 16, flows through a fluidly connected conduit 14 to a fluidly connected environmental control system 18. Working fluid WF flowing through working fluid circuit 11 flows through fluidly connected pipe 13a from a working fluid source 13, which may be fresh working fluid WF and/or working fluid WF recycled through a fluidly connected pipe 13c from a turbine 13b and/or working fluid WF recycled through a fluidly connected pipe 16a from a boiler 16, to an economizer 15. From economizer 15, working fluid WF flows to fluidly connected flow control devices 12 arranged in pipes 15a. After working fluid WF flows through the flow control devices 12 located in pipes 15a, pipes 15a enter into flue gas conduit 14. Working fluid WF flowing through pipes 15a is circulated in an upstream direction or in a direction opposite to that of the flow of flue gas FG through conduit 14. Pipes 15a exit from conduit 14 for fluid connection to working fluid outlet 17. From working fluid outlet 17, the working fluid is circulated through pipe 17a to boiler 16. In such a power plant, coal, biomass material or natural gas is combusted in the boiler 16 thereby producing a hot flue gas FG. The flue gas FG flows from the boiler 16 through the fluidly connected duct or conduit 14 thereby heating working fluid WF circulated through conduit 14 in pipes 15a. The duct or conduit 14 is also fluidly connected to an environmental control system 18, useful for removing pollutants from the flue gas FG prior to release of the flue gas FG to the environment. Other equipment, devices, systems, arrangements, pipes, ducts, and/or conduits as known to those skilled in the art, may be fluidly connected between boiler 16 and environmental control system 18, but will not be discussed further herein for purposes of preserving clarity.

Figure 2:
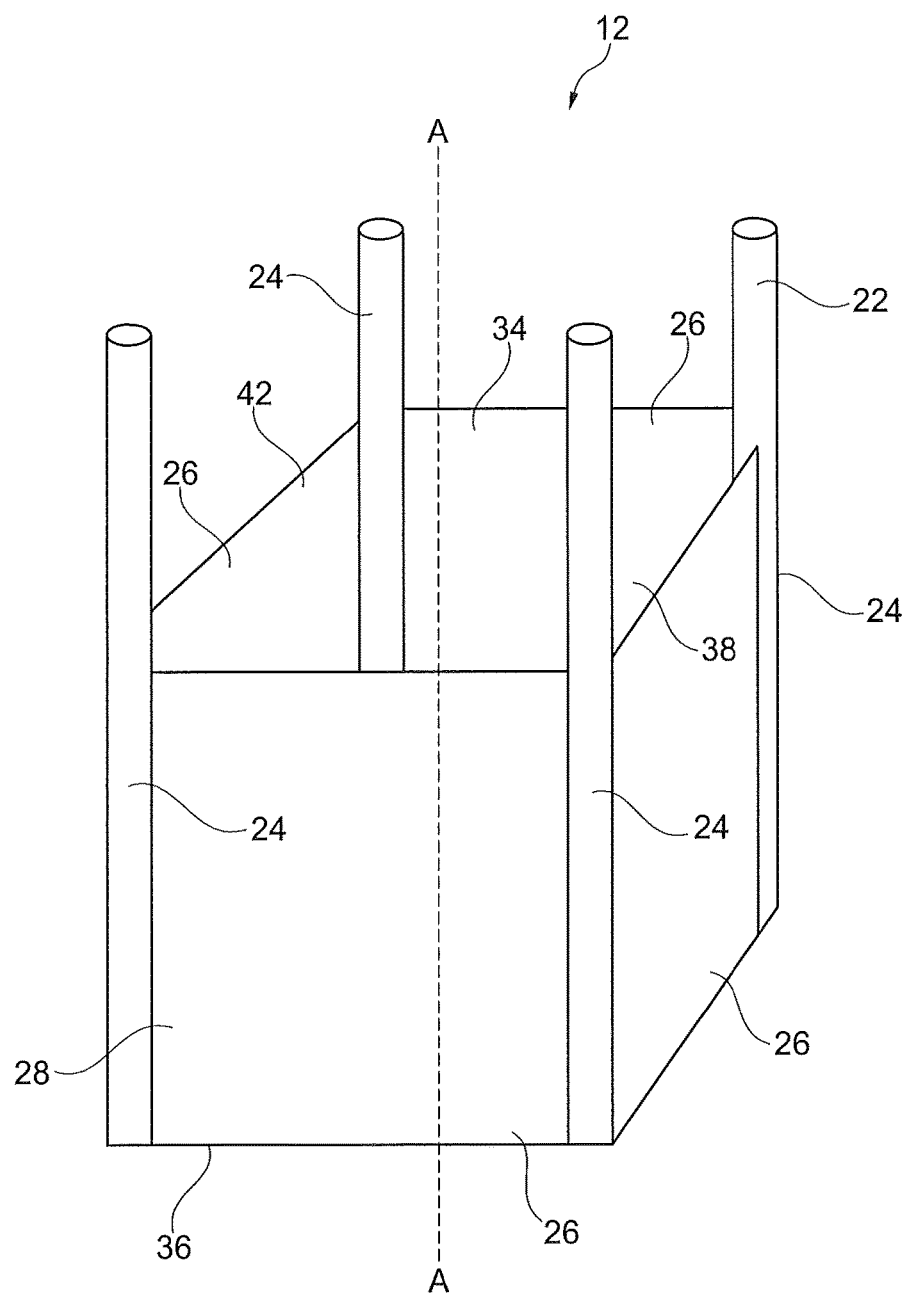
FIG. 2 is a schematic perspective side view of a housing for the flow control device of FIG. 1.

Best illustrated in FIG. 2, is a housing 22 of the subject flow control device 12. The housing 22 is illustrated as having four parallel elongated thermostatic beams 24 with four walls 26 fixed therebetween. Housing 22 also includes opposed open top end 34 and open bottom end 36, with a void interior area 38 therebetween. An exterior surface 28 of housing 22 is sized and shaped to abut against an interior surface 30 of pipe 15a. Accordingly, housing 22 is constructed to have a cross-section when taken substantially perpendicular to the longitudinal axis A-A of housing 22, approximately the same as that of pipe 15a, but of slightly smaller size so as to fit within the interior area 32 of pipe 15a. If pipe 15a has a square cross section taken substantially perpendicular to the longitudinal axis A-A of pipe 15a, housing 22 has a square cross section sized to fit snuggly therein. If pipe 15a has a circular cross section taken substantially perpendicular to the longitudinal axis A-A of pipe 15a, housing 22 has a circular cross section sized to fit snuggly therein. Further, if pipe 15a has a rectangular or any other shaped cross section taken substantially perpendicular to the longitudinal axis A-A of pipe 15a, housing 22 has a rectangular or any other like shaped cross section sized to fit snuggly therein. As such, housing 22 may be fabricated as dictated by the size and dimensions of the fluid flow conduit or pipe 15a within which housing 22 is arranged. Accordingly, housing 22 is fabricated with at least one thermostatic beam 24 and at least one wall 26 integrally formed with or attached thereto.

Figure 3:
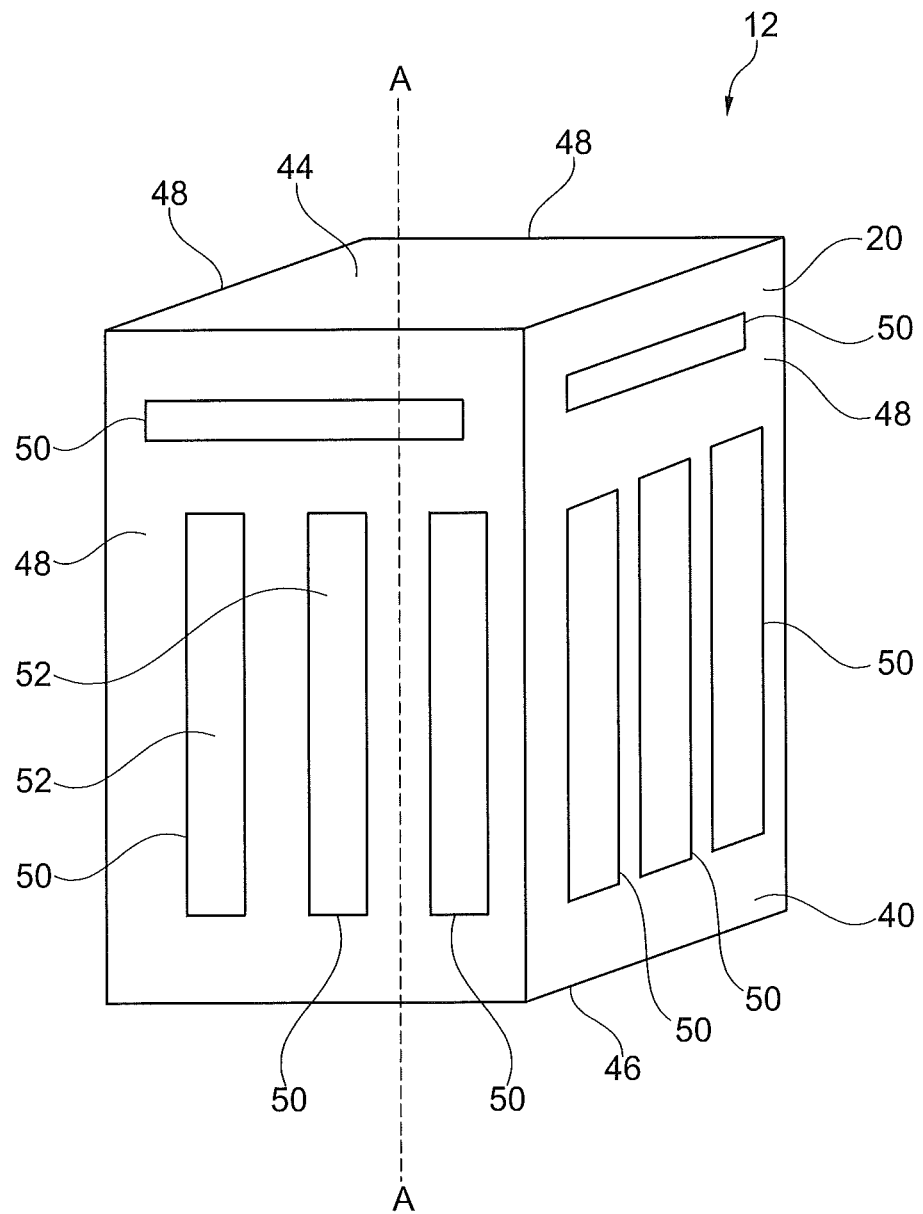
FIG. 3 is a schematic perspective side view of a center plug member for the flow control device of FIG. 1.

As best illustrated in FIG. 3, is a center plug member 20. Center plug member 20 is sized and dimensioned for exterior surface 40 to fit snugly within interior area 38 and against interior surface 42 of housing 22 with minimal fluid leakage therebetween. Center plug member 20 has a closed top end 44 opposite an open bottom end 46. Between opposed closed top end 44 and open bottom end 46 are walls 48. Depending on the shape of housing 22, center plug member is fabricated with at least one wall 48. Defined by the at least one wall 48 is at least one opening 50 through wall 48 fluidly connected to an open interior area 52 and open bottom end 46 of center plug member 20.

Figure 4:
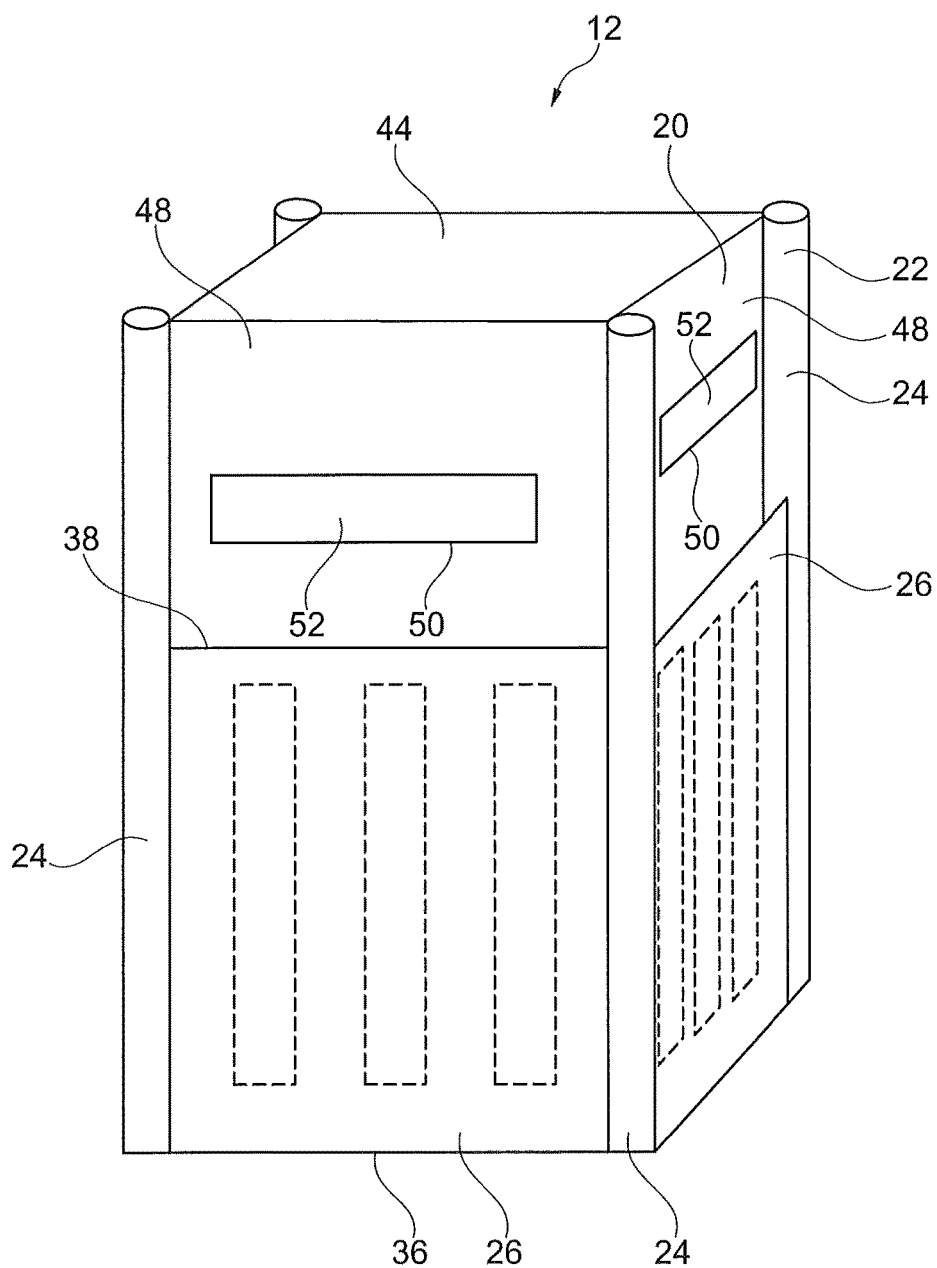
FIG. 4 is a schematic perspective side view of the center plug member of FIG. 3 arranged in an interior area of the housing of FIG. 2, thereby forming a first embodiment of the subject flow control device.

Illustrated in FIG. 4, is the subject flow control device 12 with center plug member 20 arranged within interior area 38 of housing 22. In this particular embodiment, some openings 50 are exposed when the flow control device 12 is in this first "closed" position, while others are obscured by walls 26 of housing 22. Depending on the use, if desired, all openings 50 may be obscured by walls 26 of housing 22 when the subject flow control device 12 is in this first "closed" position. In such a case, fluid flow through flow control device 12 is minimal with only fluid flow leakage around and/or through flow control device 12 accommodated within operationally acceptable limits.

Figure 5:
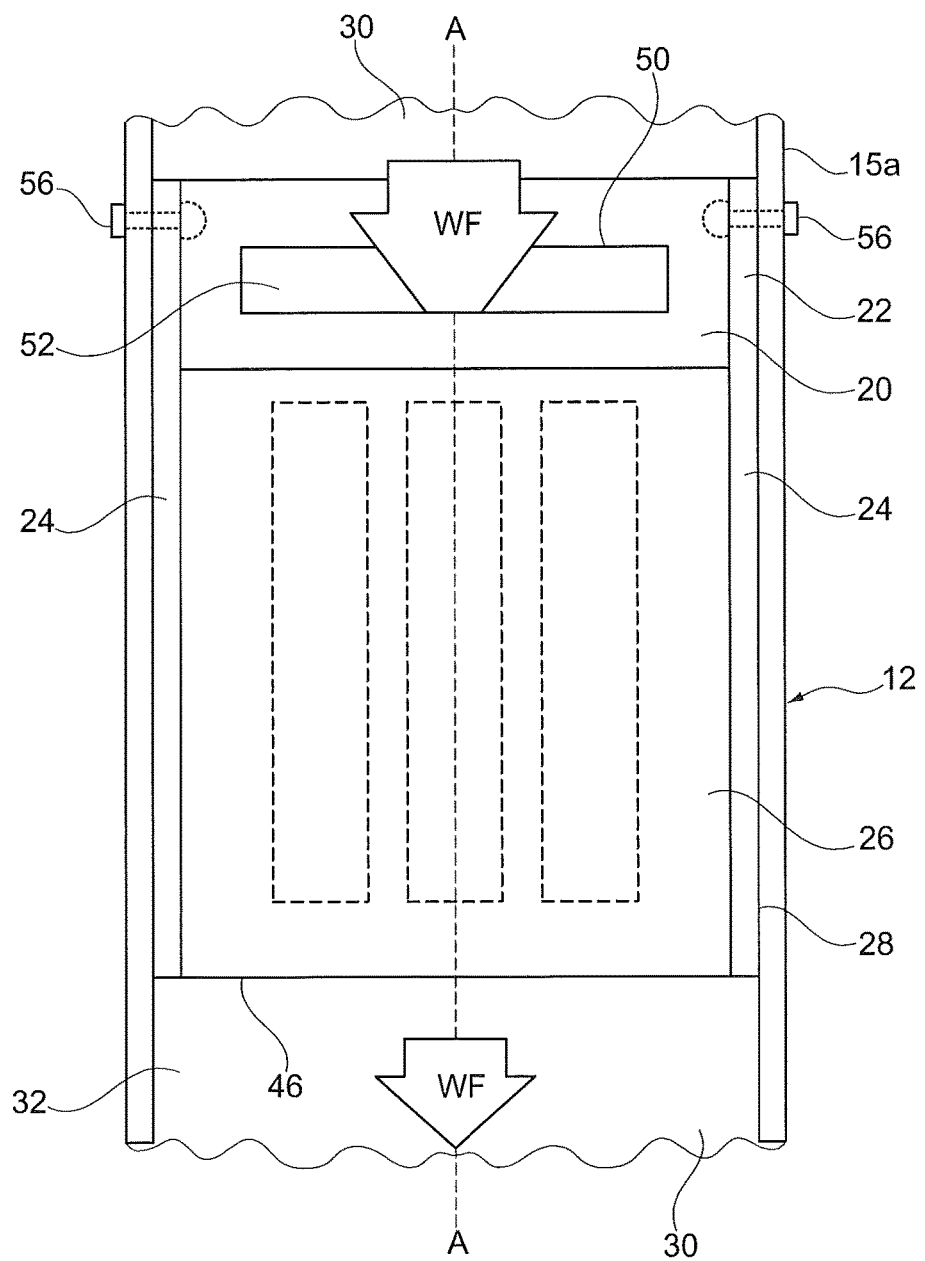
FIG. 5 is a schematic side cross-sectional view of the first embodiment of the subject flow control device of FIG. 4 in a first "closed" position arranged in a pipe or circuit for fluid flow.

Illustrated in FIG. 5, is the subject flow control device 12 in a first "closed" position arranged within pipe 15*a* of working fluid circuit 11 for working fluid WF flow therethrough. As noted previously, flow control device 12 is constructed to have a cross-section when taken substantially perpendicular to the longitudinal axis A-A, approximately the same as that of pipe 15*a*, but of slightly smaller size so as to fit snugly within the interior area 30 of pipe 15*a*. As such, the exterior surface 28 of housing 22 abuts interior surface 32 of pipe 15*a*. Once flow control device 12 is arranged within pipe 15*a*, a bolt 56 or the like is used to secure the one or more thermostatic beams 24 of housing 22 and the center plug member 20 to pipe 15*a* to prevent movement thereof within pipe 15*a*. In the illustrated embodiment of the subject flow control device 12, in this first closed position all but one opening 50 are obscured by wall 26 of housing 22. As such, working fluid WF flowing through pipe 15*a* enters between thermostatic beam portions 24 into exposed opening 50 of center plug member 20, flows through the interior area 52 of center plug member 20, and out through open bottom end 46 of center plug member 20.

Figure 6:
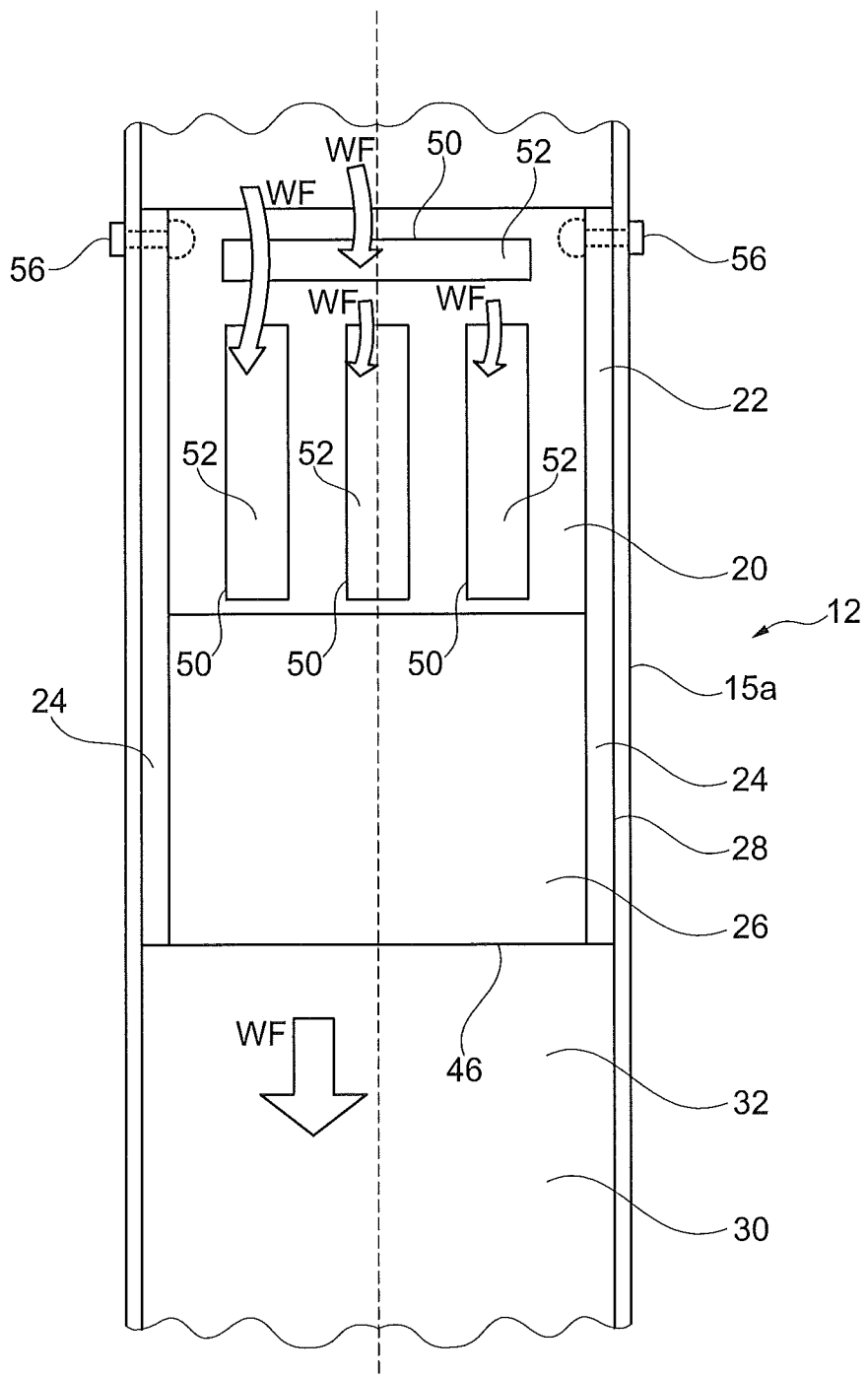
FIG. 6 is a schematic side cross-sectional view of the first embodiment of the subject flow control device of FIG. 4 in a second "open" position arranged in a pipe or circuit for fluid flow.

Illustrated in FIG. 6, is the subject flow control device 12 in a second "open" position arranged within pipe 15*a* of working fluid circuit 11 for working fluid WF flow therethrough. As noted previously, flow control device 12 is constructed to have a cross-section when taken substantially perpendicular to the longitudinal axis A-A, approximately the same as that of pipe 15*a*, but of slightly smaller size so as to fit snugly within the interior area 30 of pipe 15*a*. As such, the exterior surface 28 of housing 22 abuts interior surface 32 of pipe 15*a*. Once flow control device 12 is arranged within pipe 15*a*, a bolt 56 or the like is used to secure the one or more thermostatic beam portions 24 of housing 22 and the center plug member 20 to pipe 15*a* to prevent movement thereof within pipe 15*a*. In the illustrated embodiment of the subject flow control device 12, in this second open position all of openings 50 are exposed by wall 26 of housing 22. As such, working fluid WF flowing through pipe 15*a* enters between thermostatic beam portions 24 into exposed openings 50 of center plug member 20, flows through the interior area 52 of center plug member 20, and out through open bottom end 46.

Figure 7:
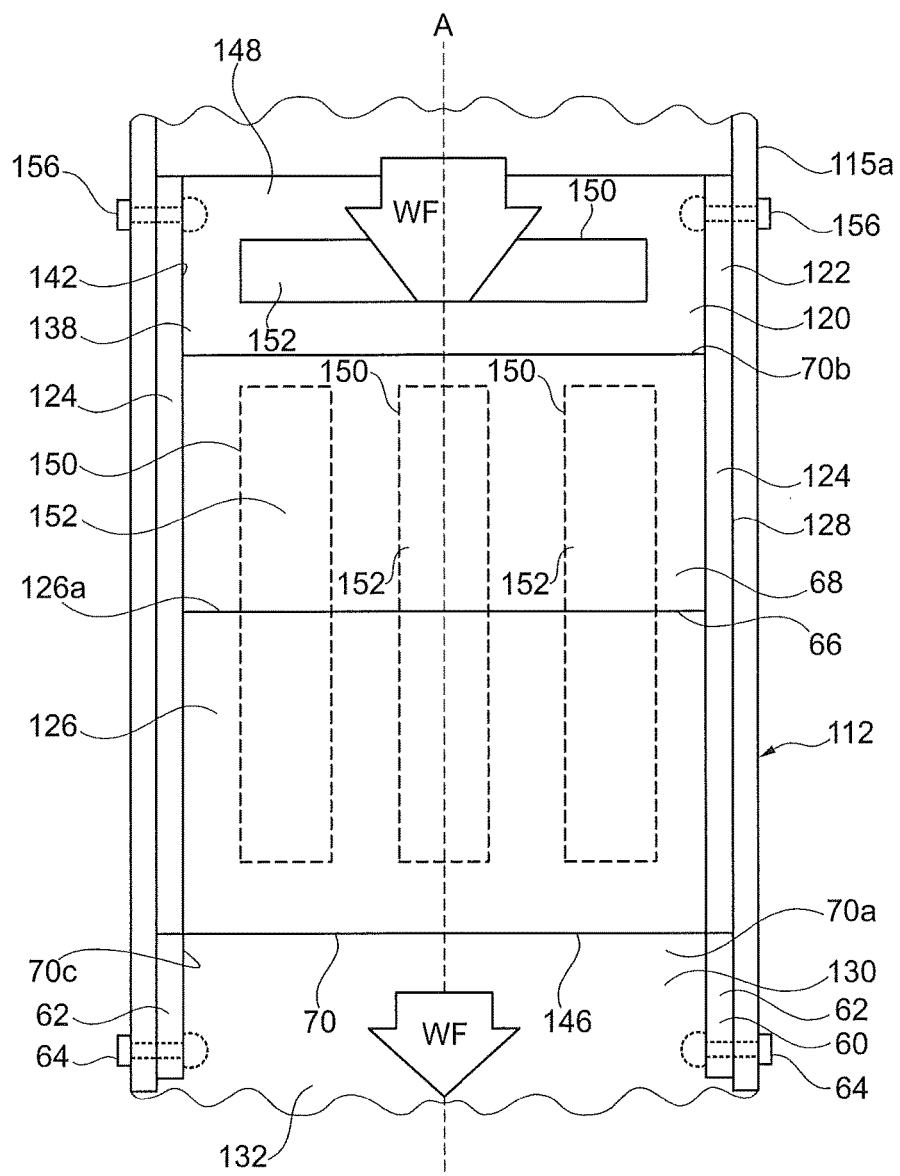
FIG. 7 is a schematic side cross-sectional view of the center plug member of FIG. 3 arranged in interior areas of two opposingly arranged housings of FIG. 2 thereby forming a second embodiment of the subject flow control device in a first "closed" position arranged in a pipe or circuit for fluid flow.

Illustrated in FIG. 7, is another embodiment of the subject flow control device 112. Flow control device 12 and flow control device 112 have many like features. Features of flow control device 112 common with those of flow control device 12 will be identified with the same reference numbers as those of flow control device 12 but with the number "1" preceding the same. Flow control device 112 in FIG. 7 is illustrated in a first "closed" position, and arranged within pipe 115*a* of working fluid circuit 11 for working fluid WF flow therethrough. Flow control device 112 like flow control device 12 is constructed to have a cross-section when taken substantially perpendicular to the longitudinal axis A-A, approximately the same as that of pipe 115*a*, but of slightly smaller size so as to fit snugly within the interior area 130 of pipe 115*a*. As such, the exterior surface 128 of housing 122 abuts interior surface 132 of pipe 115*a*. Once flow control device 112 is arranged within pipe 115*a*, a bolt 156 or the like is used to secure the one or more thermostatic beam portions 124 of first housing 122 and the center plug member 120 arranged within interior area 138 of first housing 122 to pipe 115*a* to prevent movement thereof within pipe 115*a*. Arranged oppositely to first housing 122 is a second housing 60. Second housing 60 is arranged opposite to that of first housing 122 within pipe 115*a*. As such, thermostatic beams 62 are secured by bolts 64 or the like to pipe 115*a* to prevent movement thereof within pipe 115*a*. Second housing 60 is sized and dimensioned to fit snugly within interior area 138 of first housing 122 with top 66 of wall 68 of second housing 60 at or near top 126*a* of wall 126 of first housing 122. Top 66 of wall 68 and top 126*a* of wall 126 may essentially meet, to some extent overlap, or completely overlap to obscure openings 150 in wall 148 of center plug member 120. Center plug member 120 is arranged in interior area 70 of second housing 60 defined by interior surface 70*c* between opposed open top end 70*a* and open bottom end 70*b* of second housing 60, and interior area 138 defined by interior surface 142 of first housing 122. in the subject flow control device 112, in this first closed position, all but one opening 150 are obscured by wall 126 of housing 122 and wall 68 of second housing 60. As such, working fluid WF flowing through pipe 115*a* enters between thermostatic beam portions 124 into exposed opening 150 of center plug member 120, flows through the interior area 152 of center plug member 120, and out through open bottom end 146 thereof.

Figure 8:
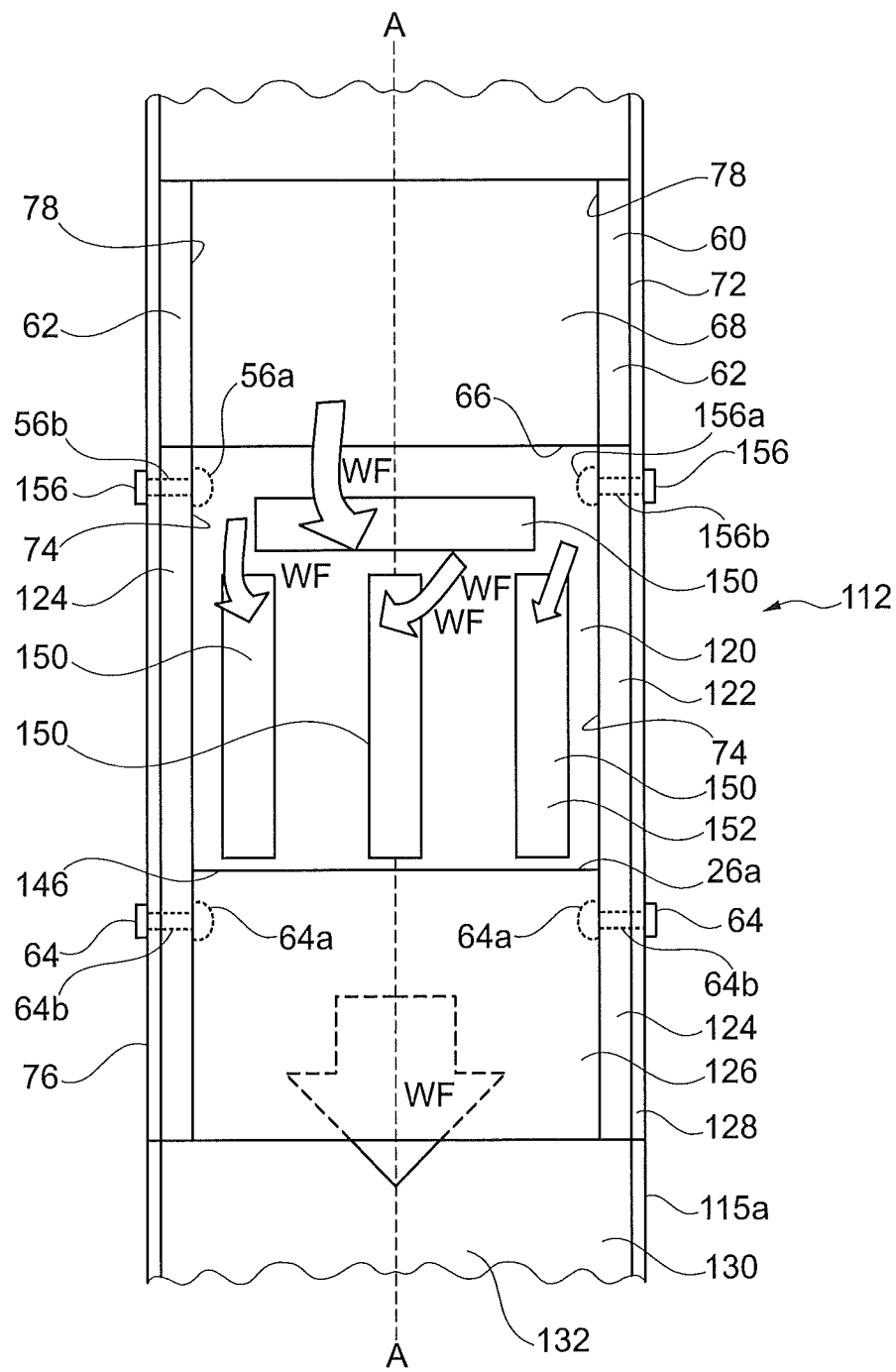
FIG. 8 is a schematic side cross-sectional view of the second embodiment of the subject flow control device of FIG. 7 in a second "open" position arranged in a pipe or circuit for fluid flow.

Illustrated in FIG. 8, is the subject flow control device 112 illustrated in FIG. 7 but in a second "open" position arranged within pipe 115*a* of working fluid circuit 11 for working fluid WF flow therethrough. As noted previously, flow control device 112 is constructed to have a cross-section when taken substantially perpendicular to the longitudinal axis A-A, approximately the same as that of pipe 115*a*, but of slightly smaller size so as to fit snugly within the interior area 130 of pipe 115*a*. As such, the exterior surface 128 of housing 122 and the exterior surface 72 of second housing 60 abuts interior surface 132 of pipe 115*a*. Once flow control device 112 is arranged within pipe 115*a*, a bolt 156 or the like is used to secure the one or more thermostatic beam portions 124 of housing 122 and the center plug member 120 to pipe 115*a* to prevent movement thereof within pipe 115*a*. Likewise, a bolt 64 or the like is used to secure the one or more thermostatic beam portions 62 of second housing 60 to pipe 115*a* to prevent movement thereof within pipe 115*a*. In the illustrated embodiment of the subject flow control device 112, in this second open position all of openings 150 of center plug member 120 are exposed by wall 126 of housing 122 and wall 68 of second housing 60. As such, working fluid WF flowing through pipe 115*a* enters between thermostatic beams 62, past wall 68, between thermostatic beam portions 124 and into exposed openings 150 of center plug member 120, flowing through the interior area 152 of center plug member 120, and out through open bottom end 146 thereof.

The subject flow distribution device 112 is positioned within interior area 130 of pipe 115*a* so exterior surface 128 of housing 122 abuts interior surface 132 of pipe 115*a*. Abutting interior surface 74 of thermostatic beams 124 of housing 122 is head 156*a* of fastening device or threaded bolt 156. Body 156*b* of fastening device or threaded bolt 156 is permanently attached to or unitarily formed with head 156*a* of fastening device or bolt 156. Body 156*b* of fastening device or bolt 156 extends through pipe 115*a* beyond exterior surface 76 of pipe 115*a* for removable engagement with end 156*c*. Abutting interior surface 78 of thermostatic beams 62 of second housing 60 is head 64*a* of fastening device or bolt 64. Body 64*b* of fastening device or bolt 64 is permanently attached to or unitarily formed with head 64*a* of fastening device or bolt 64. Body 64*b* of fastening device or bolt 64 extends through pipe 115*a* beyond exterior surface 76 of pipe 115*a* for removable engagement with end 64*c*. Fastening devices or bolts 156 and 64 securely removably fix the subject flow distribution device 112 within pipe 115*a* by preventing movement thereof within pipe 115*a*.

Flow control device 12 of FIG. 5 operates to control working fluid WF flow based on temperature variations of the working fluid WF. At times of peak power demand, power plant 10 operates at peak load conditions. At peak load conditions, more flue gas FG is produced by boiler 16 than is produced under standard load conditions, and the flue gas FG so produced is at a higher temperature than that produced under standard load conditions. Since the temperature of the working fluid WF is dependent upon the temperature of the flue gas FG, at peak load conditions, the temperature of the working fluid WF is at a higher temperature than that of working fluid WF under standard load conditions. Consequently when the working fluid WF is at a higher temperature, upon contacting the flow control device 12, the higher temperature working fluid WF increases the temperature of flow control device 12. Upon an increase in temperature of flow control device 12, thermostatic beams 24 expand in an outward or downstream direction. As such, the flow control device 12 of FIG. 5 in a first closed position under goes expansion to the flow control device 12 of FIG. 6 in a second open position to expose or further expose one or more openings 50 in center plug member 20. Exposing or further exposing one or more openings 50 in center plug member 20 accommodates an increased flow of working fluid WF through pipe 15*a* as needed during power plant 10 operation at peak load conditions.

At times of relatively low power demand, power plant 10 operates at low load conditions. At low load conditions, less flue gas FG is produced by boiler 16 than is produced under standard load conditions, and the flue gas FG so produced is at a lower temperature than that produced under standard load conditions. Since the temperature of the working fluid WF is dependent upon the temperature of the flue gas FG, at low load conditions the temperature of the working fluid WF is at a lower temperature than that of working fluid WF under standard load conditions. Consequently when the working fluid WF is at a lower temperature, upon contacting the flow control device 12, the lower temperature working fluid WF decreases the temperature of flow control device 12. Upon a decrease in temperature of flow control device 12, thermostatic beams 24 contract in an inward or upstream direction. As such, the flow control device 12 of FIG. 6 in a second open position under goes contraction to the flow control device 12 of FIG. 5 in a first closed position to obscure or further obscure one or more openings 50 in center plug member 20. Obscuring or further obscuring one or more openings 50 in center plug member 20 accommodates the decreased flow of working fluid WF through pipe 15*a* as needed during power plant 10 operation at low load conditions.

A method of using flow control device 12 is arranging and securing flow control device 12 within a conduit or pipe 15*a* for fluid flow, then contacting flow control device 12 with a working fluid WF flow. If the working fluid WF is of a temperature warmer than that of flow control device 12, thermostatic beams 24 expand thereby displacing walls 26 in an outward or downstream direction. Displacement of walls 26 in an outward or downstream direction exposes or further exposes one or more openings 50 in center plug member 20 to accommodate an increased flow of working fluid therethrough. If the working fluid WF is of a temperature cooler than that of flow control device 12, thermostatic beams 24 contract thereby displacing walls 26 in an inward or upstream direction. Displacement of walls 26 in an inward or upstream direction obscures or further obscures one or more openings 50 in center plug member 20 to accommodate a decreased flow of working fluid therethrough.

Flow control device 112 of FIG. 7 operates to control working fluid WF flow based on temperature variations of the working fluid WF. At times of peak power demand, power plant 10 operates at peak load conditions. At peak load conditions, more flue gas FG is produced by boiler 16 than is produced under standard load conditions and the flue gas FG so produced is at a higher temperature than that produced under standard load conditions. Since the temperature of the working fluid WF is dependent upon the temperature of the flue gas FG, at peak load conditions, the temperature of the working fluid WF is at a higher temperature than that of working fluid WF under standard load conditions. Consequently when the working fluid WF is at a higher temperature, upon contacting the flow control device 112, the higher temperature working fluid WF increases the temperature of flow control device 112. Upon an increase in temperature of flow control device 112, thermostatic beams 124 expand in a downstream direction, and thermostatic beams 62 expand in a upstream direction. As such, the flow control device 112 of FIG. 7 in a first closed position under goes expansion to the flow control device 112 of FIG. 8 in a second open position to expose or further expose one or more openings 150 in center plug member 120. Exposing or further exposing one or more openings 150 in center plug member 120 accommodates an increased flow of working fluid WF through pipe 115*a* as needed during power plant 10 operation at peak load conditions.

At times of relatively low power demand, power plant 10 operates at low load conditions. At low load conditions, less flue gas FG is produced by boiler 16 than is produced under standard load conditions and the flue gas FG so produced is at a lower temperature than that produced under standard load conditions. Since the temperature of the working fluid WF is dependent upon the temperature of the flue gas FG, at low load conditions, the temperature of the working fluid WF is at a lower temperature than that of working fluid WF under standard load conditions. Consequently when the working fluid WF is at a lower temperature, upon contacting the flow control device 112, the lower temperature working fluid WF decreases the temperature of flow control device 112. Upon a decrease in temperature of flow control device 112, thermostatic beams 124 contract in an upstream direction, and thermostatic beams 62 contract in a downstream direction. As such, the flow control device 112 of FIG. 8 in a second open position under goes contraction to the flow control device 112 of FIG. 7 in a first closed position to obscure or further obscure one or more openings 150 in center plug member 120. Obscuring or further obscuring one or more openings 150 in center plug member 120 accommodates the decreased flow of working fluid WF through pipe 115*a* as needed during power plant 10 operation at low load conditions.

A method of using flow control device 112 is arranging and securing flow control device 112 within a conduit or pipe 115*a* for fluid flow, then contacting flow control device 112 with working fluid WF flow. If the working fluid WF is of a temperature warmer than that of flow control device 112, thermostatic beams 124 expand thereby displacing walls 126 in a downstream direction. Likewise, thermostatic beams 62 expand thereby displacing walls 68 in an upstream direction. Displacement of walls 126 in a downstream direction and displacement of walls 68 in an upstream direction exposes or further exposes one or more openings 150 in center plug member 120 to accommodate an increased flow of working fluid therethrough. Flow control device 112 operates with approximately half the necessary expansion of thermostatic beams 124 and 62 as that required of beams 24 for operation of flow control device 12. If the working fluid WF is of a temperature cooler than that of flow control device 112, thermostatic beams 124 contract thereby displacing walls 126 in an upstream direction. Likewise, thermostatic beams 62 contract thereby displacing walls 68 in a downstream direction. Displacement of walls 126 in an upstream direction and walls 68 in a downstream direction obscures or further obscures one or more openings 150 in center plug member 120 to accommodate a decreased flow of working fluid therethrough.

Beams 24, 124, 62 of housing 22, 122 of the subject flow control device 12, 122 is fabricated from a suitable thermostatic material. A suitable thermostatic material is a thermostatic material stable and not deformable at temperatures underwhich the housing 22, 122 of flow distribution device 12, 112 is employed. Further, a suitable thermostatic material is a thermostatic material that has the desired temperature dependent expansion and contraction characteristics for the intended use of the housing 22, 122 of the flow distribution device 12, 112. For purposes of the present housing 22, 122 of flow distribution device 12, 112 suitable thermostatic materials include for example but are not limited to one or more materials selected from the group consisting of alloy metal grades, or more specifically, one or more materials selected from the group consisting of austenitic metal grades, because of their desirable thermostatic characteristics. The preferred material for the fabrication of beams 24, 124, 62 of housing 22, 122 is a stainless steel austenitic metal grade, such as Grade 304ss (austenitic steel) widely commercially available from many sources because of its desirable thermostatic characteristics. Walls 26, 126, 68, and center plug member 20, 120 are fabricated from one or more suitable corrosion resistant materials. Suitable corrosion resistant materials for the fabrication of walls 26, 126, 68, and center plug member 20, 120 include for example but are not limited to one or more materials selected from the group consisting of alloy metal grades, or more specifically, one or more materials selected from the group consisting of ferritic metal grades, because of their desirable corrosion resistance characteristics. As an exemplifying embodiment, beams 24, 124, 62 of housing 22, 122 of the subject flow distribution device 12, 112 is fabricated from Grade 304ss (austenitic steel). Grade 304ss (austenitic steel) is a thermostatic material with desirable characteristics of stability within a temperature range of 0 to 500 degrees Celsius to which it will be exposed during use in plant 10. As the working fluid WF temperature increases 300 to 500 degrees Celsius, or more specifically, increases 300 to 350 degrees Celsius, or most specifically, increases 312 degrees Celsius, beams 24, 124, 62 heated by contact with the working fluid WF expand approximately 0.6%, thereby displacing walls 26, 126, 68 approximately 0.6% of a distance toward second open position, from a position between first closed position and second open position, or from first closed position. Displacement of walls 26, 126, 68 approximately 0.6% of a distance from first closed position toward second open position, exposes or further exposes openings 50, 150 in center plug member 20, 120. Exposure or further exposure of openings 50, 150 accommodates an increase in working fluid WF flow therethrough. Likewise, as the working fluid WF temperature decreases in temperature 300 to 500 degrees Celsius, or more specifically, decreases in temperature 300 to 350 degrees Celsius, or most specifically, decreases in temperature 312 degrees Celsius, beams 24, 124, 62 cooled by contact with the working fluid WF contract approximately 0.6%, thereby causing displacement of walls 26, 126, 68 approximately 0.6% of a distance toward first closed position, from a position between first closed position and second open position, or from second open position. Displacement of walls 26, 126, 68 approximately 0.6% of a distance from second open position toward first closed position, obscures or further obscures of openings 50, 150 thereby accommodating a decrease in working fluid WF flow therethrough.

Figure 9:
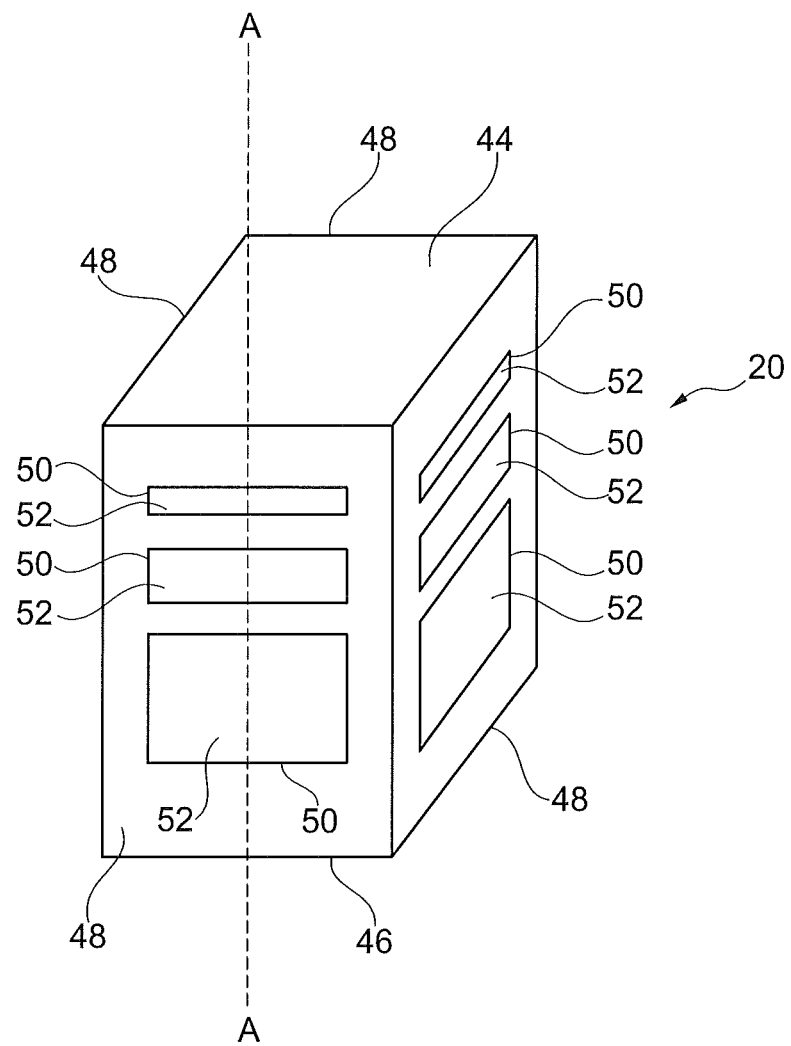
FIG. 9 is a schematic perspective side view of another embodiment of a center plug member for the flow control device of FIG. 1.
Figure 10:
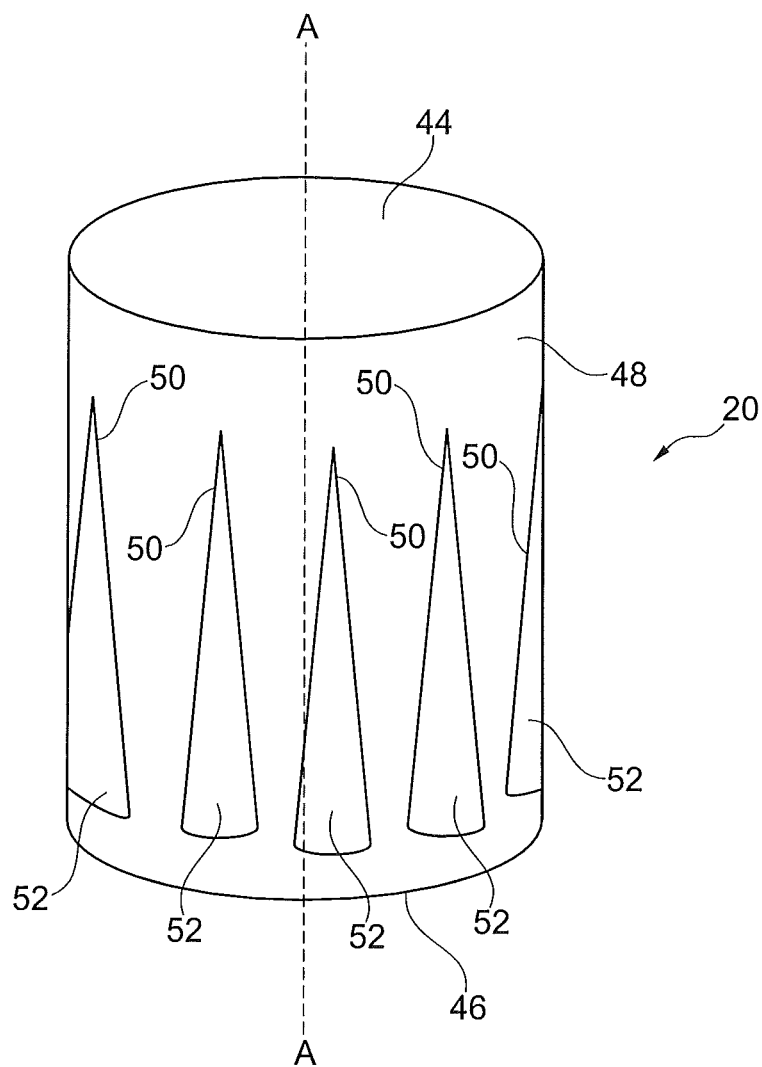
FIG. 10 is a schematic perspective side view of another embodiment of a center plug member for the flow control device of FIG. 1.
Figure 11:
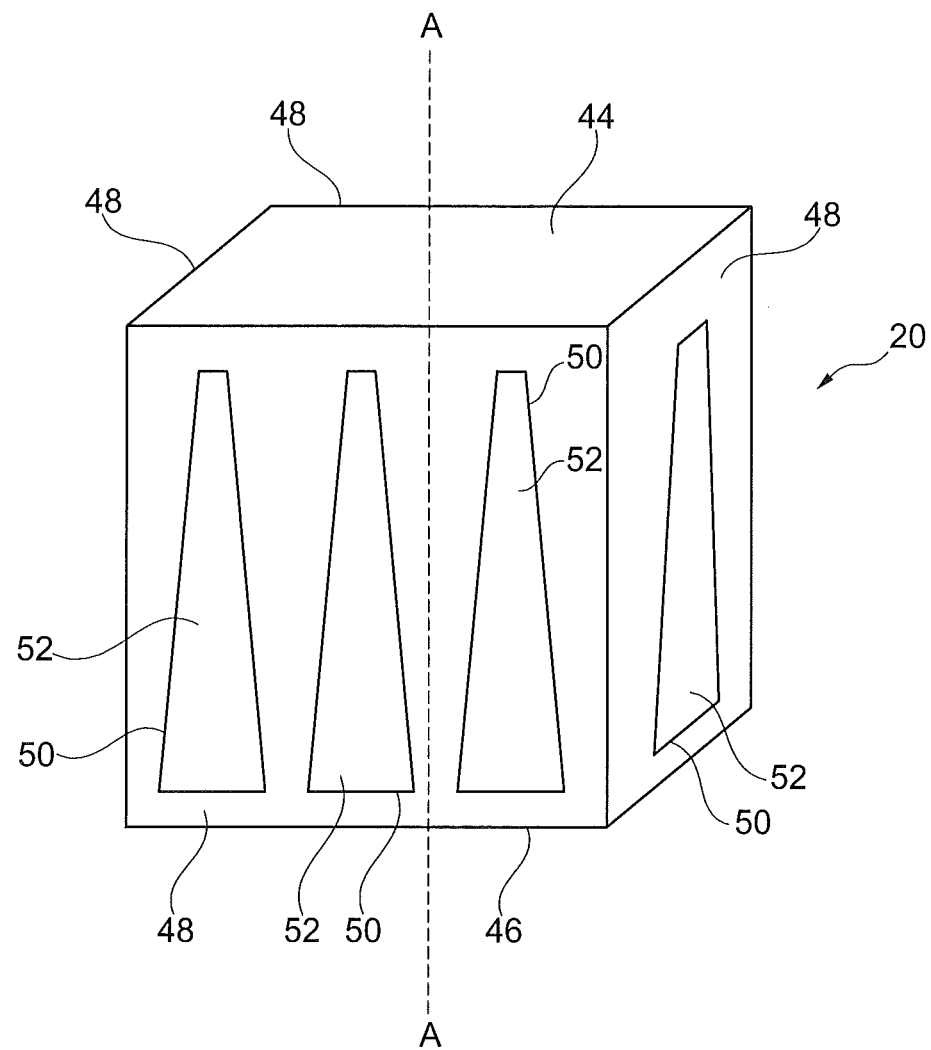
FIG. 11 is a schematic perspective side view of another embodiment of a center plug member for the flow control device of FIG. 1.

Illustrated in FIGS. 9, 10 and 11 are various embodiments of center plug member 20, 120. FIG. 9 illustrates a center plug member 20, 120 having an essentially square cross section taken perpendicular to the axis A-A therethrough with a plurality of rectangular openings 50, 150 in walls 48, 148. This center plug member 20, 120 is fabricated for arrangement within a housing 22, 122 also having an essentially square cross section taken perpendicular to an axis A-A therethrough. FIG. 10 illustrates a center plug member 20, 120 having an essentially circular or oval cross section taken perpendicular to the axis A-A therethrough with a plurality of triangular openings 50, 150 in wall 48, 148. This center plug member 20, 120 is fabricated for arrangement within a housing 22, 122 also having an essentially circular or oval cross section taken perpendicular to an axis A-A therethrough. FIG. 11 illustrates a center plug member 20, 120 having an essentially rectangular cross section taken perpendicular to the axis A-A therethrough with a plurality of trapezoidal openings 50, 150 in wall 48, 148. This center plug member 20, 120 is fabricated for arrangement within a housing 22, 122 also having an essentially rectangular cross section taken perpendicular to an axis A-A therethrough. FIGS. 9, 10 and 11 are provided as further exemplifying embodiments for purposes of illustration and not limitation.

In summary, the present disclosure provides a flow control device 12, 112 comprising at least one housing 22, 122 with each housing 22, 122 comprising at least one thermostatic beam 24, 124, 62 and at least one wall 26, 126, 68 fixed thereto defining a void interior area 38, 138, 70 between opposed open ends 34, 36, 134, 136, 70a, 70b and a center plug member 20, 120 fixed within the interior area 38, 138, 70 of the at least one housing 22, 122, 60 with at least one opening 50, 150 in at least one wall 48, 148 of the center plug member 20, 120 for a fluid flow therethrough dependent upon a temperature of the fluid flow. The at least one thermostatic beam 24, 124, 62 of the at least one housing 22, 122, 60 is fabricated from one or more thermostatic materials selected from the group consisting of austenitic metal grades. The at least one wall 26, 126, 68 fixed to the at least one thermostatic beam 24, 124, 62 is fabricated from one or more materials selected from the group consisting of ferritic metal grades. The center plug member 20, 120 is fabricated from one or more materials selected from the group consisting of ferritic metal grades. The interior surface 42, 142, 70c of the at least one housing may be coated with one or more materials selected from the group consisting of ceramic materials and polytetrafluoroethylene. Likewise, an external wall surface 40, 140 of the center plug member 20, 120 may be coated with one or more materials selected from the group consisting of ceramic materials and polytetrafluoroethylene. As such, the subject flow control device 12, 112 is operable for a temperature increase of 312 degrees Celsius for thermostatic beam 24, 124, 62 expansion of 0.6% displacing the at least one wall 26, 126, 68 fixed to the at least one thermostatic beam 24, 124, 68 approximately 0.6% of a total possible distance in a direction toward an open position to expose or further expose the at least one opening 50, 150 in the center plug member 20, 120 to accommodate an increase in fluid flow through the at least one opening 50, 150. Further, the subject flow control device 12, 112 is operable for a temperature decrease of 312 degrees Celsius for thermostatic beam 24, 124, 62 contraction of 0.6% displacing the at least one wall 26, 126, 68 fixed to the at least one thermostatic beam 24, 124, 62 approximately 0.6% of a total possible distance in a direction toward a closed position to obscure or further obscure the at least one opening 50, 150 in the center plug member 20, 120 to accommodate a decrease in fluid flow through the at least one opening 50, 150.

A method of using the subject flow control device 12, 112 is summarized by arranging at least one housing 22, 122, 60 each comprising at least one thermostatic beam 24, 124, 62 and at least one wall 26, 126, 68 fixed thereto defining a void interior area 38, 138, 70 between opposed open ends 34, 36, 134, 136, 70a, 70b within a pipe 15a, 115a or circuit for fluid flow, and arranging a center plug member 20, 120 within the interior area 38, 138, 70 of the at least one housing 22, 122, 60 with at least one opening 50, 150 in at least one wall 48, 148 of the center plug member 20, 120 for a fluid flow therethrough dependent upon a temperature of the fluid flow. For purposes of this method, the at least one thermostatic beam 24, 124, 62 of the at least one housing 22, 122, 60 is fabricated from one or more thermostatic materials selected from the group consisting of austenitic metal grades, the at least one wall 26, 126, 68 fixed thereto is fabricated from one or more materials selected from the group consisting of ferritic metal grades, and the center plug member 20, 120 is fabricated from one or more materials selected from the group consisting of ferritic metal grades. The subject flow control device 12, 112 is operable in accordance with this method with a temperature increase of 312 degrees Celsius causing thermostatic beam 24, 124, 62 expansion of 0.6% displacing the at least one wall 26, 126, 68 fixed thereto approximately 0.6% of a total possible distance in a direction toward an open position to expose or further expose the at least on opening 50, 150 in the center plug member 20, 120 to accommodate an increase in fluid flow therethrough. Likewise, the subject flow control device 12, 112 is operable in accordance with a temperature decrease of 312 degrees Celsius causing thermostatic beam 24, 124, 62 contraction of 0.6% displacing the at least one wall 26, 126, 68 fixed thereto approximately 0.6% of a total possible distance in a direction toward a closed position to obscure or further obscure the at least one opening 50, 150 in center plug member 20, 120 to accommodate a decrease in fluid flow therethrough.

Still another method of using the subject flow control device 12, 112 comprises arranging at least one housing 22, 122, 60, each comprising at least one thermostatic beam 24, 124, 62 and at least one wall 26, 126, 68 fixed thereto defining a void interior area 38, 138, 70 between opposed open ends 34, 36, 134, 136, 70a, 70b within a pipe 15a, 115a or circuit for fluid flow, arranging a center plug member 20, 120 with at least one opening 50, 150 in at least one wall 48, 148 thereof within the interior area 38, 138, 70 of the at least one housing 22, 122, 60 to control fluid flow through the at least one opening 50, 150 dependent upon a temperature of the fluid flow, and producing a fluid flow within the pipe 15a, 115a or circuit with a temperature of fluid flow contacting the at least one housing 22, 122, 60, and if the fluid flow temperature is greater than a temperature of the at least one housing 22, 122, 60, the at least one thermostatic beam 24, 124, 62 expanding to displace the wall 26, 126, 68 fixed thereto with the displacement of the wall 26, 126, 68 exposing or further exposing the at least one opening 50, 150 in the center plug member 20, 120 to increase fluid flow therethrough, and if the fluid flow temperature is less than a temperature of the at least one housing 22, 122, 60, the at least one thermostatic beam 24, 124, 62 contracting to displace the wall 26, 126, 68 fixed thereto with the displacement of the wall 26, 126, 68 obscuring or further obscuring the at least one opening 50, 150 in the center plug member 20, 120 to decrease fluid flow therethrough. For purposes of this method, the at least one thermostatic beams 24, 124, 62 is fabricated from one or more thermostatic materials selected from the group consisting of austenitic metal grades, the at least one wall 26, 126, 68 fixed to the at least one thermostatic beams is fabricated from one or more materials selected from the group consisting of ferritic metal grades, and the center plug member 20, 120 is fabricated from one or more materials selected from the group consisting of ferritic metal grades. Likewise, the subject flow control device 12, 112 is operable for a temperature increase of 312 degrees Celsius for thermostatic beam 24, 124, 62 expansion of 0.6% displacing the at least one wall 26, 126, 68 fixed thereto approximately 0.6% of a total possible distance in a direction toward an open position to expose or further expose the at least on opening 50, 150 in the center plug member 20, 120 to accommodate an increase in fluid flow therethrough. Similarly, the subject flow control device 12, 112 is operable for a temperature decrease of 312 degrees Celsius for thermostatic beam 24, 124, 62 contraction of 0.6% displacing the at least one wall 26, 126, 68 fixed thereto approximately 0.6% of a total possible distance in a direction toward a closed position to obscure or further obscure the at least one opening 50, 150 in the center plug member 20, 120 to accommodate a decrease in fluid flow therethrough.

While preferred embodiments have been shown and described, various modifications and substitutions may be made thereto without departing from the spirit and scope of the invention. Accordingly, it is to be understood that the present invention has been described by way of illustration and not limitation.

The invention claimed is:

1. A flow control device for a fluid comprising:
a housing comprising at least one sidewall and defining a longitudinal axis, the housing including an elongated thermostatic beam extending generally parallel to the longitudinal axis, the at least one sidewall being fixed to the thermostatic beam, a first interior area within the housing, the housing having an open top end and an open bottom end, the bottom end disposed opposite the top end; the first interior area being disposed between the open top end and the open bottom end; and
a center plug member comprising a second interior area therein and at least one wall, the center plug having a shape corresponding to a shape of the housing and dimensioned so that the center plug member fits within the first interior area of the housing; the at least one wall defining an opening therethrough to allow the fluid to pass between the first interior area of the housing and the second interior area of the center plug member, and the flow control device being operable within a pipe to allow the fluid to flow between the first interior area of the housing and through the opening in the at least one wall of the center plug depending on a temperature of the fluid.

2. The flow control device of claim 1, wherein the thermostatic beam is fabricated from one or more thermostatic materials selected from the group consisting of austenitic metal grades.

3. The flow control device of claim 1, wherein the center plug member is fabricated from one or more materials selected from the group consisting of ferritic metal grades.

4. The flow control device of claim 1, wherein an interior surface of the sidewall of the housing is coated with one or more materials selected from the group consisting of ceramic materials and polytetrafluoroethylene.

5. The flow control device of claim 1, wherein an external surface of the wall of the center plug member is coated with one or more materials selected from the group consisting of ceramic materials and polytetrafluoroethylene.

6. The flow control device of claim 1, wherein the device is operable for a temperature increase of 312 degrees Celsius for thermostatic beam expansion of 0.6% displacing the at least one wall fixed to the thermostatic beam approximately 0.6% of a total possible distance in a direction toward an open position to expose or further expose the opening in the center plug member to accommodate an increase in fluid flow through the opening.

7. The flow control device of claim 1, wherein the device is operable for a temperature decrease of 312 degrees Celsius for thermostatic beam contraction of 0.6% displacing the at least one wall fixed to the thermostatic beam approximately 0.6% of a total possible distance in a direction toward a closed position to obscure or further obscure the at least one opening in the center plug member to accommodate a decrease in fluid flow through the opening.

8. The flow control device of claim 1, wherein in response to an increase in temperature of the fluid in the housing, an expansion of the thermostatic beam thereby displaces the at least one sidewall of the housing in a direction that exposes or further exposes the at least one opening defined by the at least one wall of the center plug member.

9. The flow control device of claim 1, wherein in response to a decrease in temperature of the fluid in the housing, a contraction of the thermostatic beam thereby displaces the at least one sidewall of the housing in a direction that obscures or further obscures the at least one opening defined by the at least one wall of the center plug member.

10. The flow control device of claim 1, wherein the contraction of the thermostatic beam occurs at a first temperature, and the expansion of the thermostatic beam occurs at a second temperature, wherein the first temperature is lower than the second temperature.

11. A device for controlling a fluid flow in a pipe, comprising:
a housing having first open end to receive the fluid flow therethrough, and second open end to emit the fluid flow therethrough, the first open end disposed upstream of the second open end with respect to the fluid flow, the housing enclosing a first interior area disposed therebetween and in fluid communication with the first and second open ends; the housing further comprising:
a thermostatic beam portion fixedly coupled to the housing, the thermostatic beam portion having a first length at a first temperature of the fluid, and a second length at a second temperature of the fluid;
a first wall member movably coupled to the thermostatic beam portion, and oriented in a first closed position based on the first length of the thermostatic beam portion, and oriented in a second open position based on the second length of the thermostatic beam portion;
a center plug member comprising a second interior area therein, the center plug member disposed within the first interior area and comprising a third open end to receive the fluid flow from the first interior area, the center plug member second interior area configured to receive the fluid flow from the third open end, the center plug member further comprising a second wall member defining an opening therethrough in fluid communication with the second interior area, and disposed downstream of the second interior area;
wherein the first wall member covers a first portion of the opening when in the first closed position, and covers a second portion of the opening when in the second open position.

12. The flow control device of claim 11 wherein the device is operatively disposable within a pipe.

13. The flow control device of claim 11, wherein the thermostatic beam portion is fabricated from one or more thermostatic materials selected from the group consisting of austenitic metal grades.

14. The flow control device of claim 11, wherein the center plug member is fabricated from one or more materials selected from the group consisting of ferritic metal grades.

15. The flow control device of claim 11, wherein an interior surface of the housing is coated with one or more materials selected from the group consisting of ceramic materials and polytetrafluoroethylene.

16. The flow control device of claim 11, wherein an external surface of the wall of the center plug member is coated with one or more materials selected from the group consisting of ceramic materials and polytetrafluoroethylene.

17. The flow control device of claim 11, wherein the device is operable for a temperature increase of 312 degrees Celsius for thermostatic beam portion expansion of 0.6% displacing the first wall member approximately 0.6% of a total possible distance in a direction toward the second open position.

18. The flow control device of claim 11, wherein the device is operable for a temperature decrease of 312 degrees Celsius for thermostatic beam portion contraction of 0.6% displacing the first wall member approximately 0.6% of a total possible distance in a direction toward the first closed position.

19. The flow control device of claim 11, wherein the first portion is greater than the second portion.

20. The flow control device of claim 11, wherein the thermostatic beam portion is a thermostatic beam.

21. The flow control device of claim 11, wherein the center plug has a circular cross section.

* * * * *